Oct. 21, 1958     M. A. MOSKOVITZ     2,857,190

COMPRESSION-LOADED BALL JOINT

Filed April 2, 1956

INVENTOR.
MILTON A. MOSKOVITZ
BY: Ben V. Zillman
ATTORNEY

2,857,190
COMPRESSION-LOADED BALL JOINT

Milton A. Moskovitz, Richmond Heights, Mo., assignor of one-half to Harry Frankel, St. Louis, Mo.

Application April 2, 1956, Serial No. 575,540

6 Claims. (Cl. 287—87)

This invention relates to ball joints generally, but more especially to those adapted for installation in motor vehicles, for interconnection between a pair of relatively movable members, as between the control arms of the steering mechanism and the spindle knuckles of the front or steerable wheels, and in such an arrangement where the joint is under a compression load in service.

Such joints must absorb rather heavy loads and be subjected to extreme shocks as the vehicle travels over the roadway, and yet they must not be so strong and stiff and unyielding as to materially reduce the comfort of the occupants riding in the vehicle.

One of the principal objects of this invention is to so design such a joint that it will be capable of safely withstanding heavy compression loads in service, and at the same time meet the requirements for yieldability or springing that is necessary for "cornering" and prevent excessive cambering of the front wheels during such "cornering," while always insuring as soft and cushiony a ride as is practical.

Another object of my invention is to so construct such a joint that there is a minimum of wear between its moving parts, and thereby result in high longevity with safety in service.

An added object of the invention is to so construct such a joint that will enable the use of a quite weak material as a bearing element of the same and which would not stand up under the service to which the joint would be ordinarily subjected, but when combined with a reinforcing element that is made of a very much stronger material that will take substantially all of the compression load, will render the unit as a whole safe and efficient to reliably and safely absorb such load and work with a minimum of frictional wear.

A further object of my invention is to construct such a joint to include a lubricant-feeding system leading to the bearing surfaces of the joint structure, and wherein there is a lubricant reservoir that is substantially sealed off from the thrust-absorbing surfaces of the joint and from whence the lubricant is fed as needed to said bearing surfaces.

Many other objects and advantages of the construction herein shown and described will be obvious to those skilled in the art to which this invention apertains, as will be apparent from the disclosures hereinafter stated.

To this end, my invention consists in the novel form, arrangement, combination of parts and construction herein shown and described, all as will be more clearly set forth in the following description.

Figure 1:
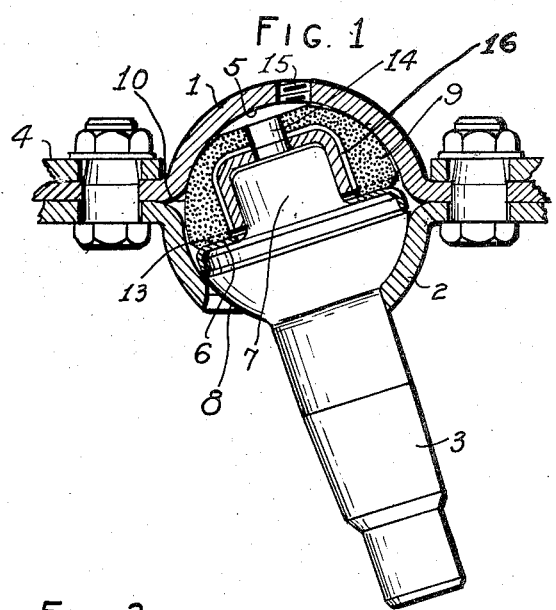
Figure 2:
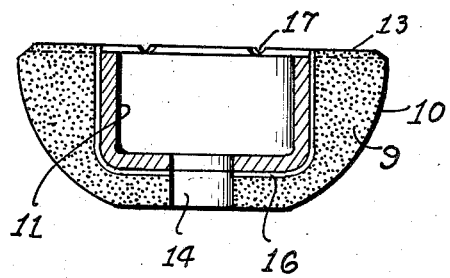
Figure 3:
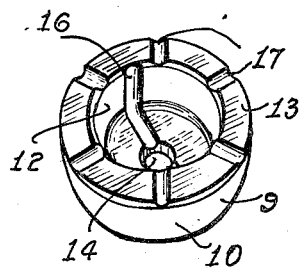

In the drawings, wherein like reference characters represent like or corresponding parts throughout the views, Figure 1 is a vertical cross-sectional view through the joint assembly, and showing some of the parts in elevation; and Figure 2 is a cross-sectional detail of the bushing unit with the reinforcing cup in place therein; and Figure 3 is a perspective view of said unit with said cup removed.

Referring more particularly to the drawings, wherein I have illustrated a preferred embodiment of my invention, there is shown a joint structure that is especially intended for interconnection between a pair of relatively movable members of a motor vehicle, as for instance between a control arm of the steering mechanism and the spindle knuckle of one of the front wheels, and in this instance, the joint is so mounted in the vehicle as to be under a compression load in transmitting the car load to the said knuckle, as for example when the joint is situated between said knuckle and the lower control arm of the vehicle.

The joint includes a casing or housing composed of a pair of opposed hollow shells 1—2 that together provide a chamber therebetween, said chamber being open at one end, as at the lower end in the structure shown in the drawing, Fig. 1, said housing adapted to be mounted on the lower control arm, a portion of the latter being indicated at 4.

A steel stud, provided with a radially enlarged, substantially semi-spherical head at one end, is arranged for rotatably and tiltably moving in said chamber and has its shank 3 projecting axially outwardly through the lower, open end of said casing. The interior bounding wall of said chamber is formed with a substantially spherical concave bearing surface 5.

The head of the stud has an annular band portion or face 6 extending radially inwardly as a planar surface from adjacent the upper end of said head, and there is a cylindrical extension 7 projecting upwardly beyond the central portion of head. Said stud head is formed with a convex bearing surface 8 opposed to said concave bearing surface of the housing.

A bushing is interposed between the stud and the housing, somewhat as shown at 9 and has an approximately spherical external bounding or bearing surface 10 that is opposed to and engages said concave bearing surface of the housing but has a greater degree of curvature than the latter, whereby said curved surfaces will not be truly complemental, but only partially so, thereby resulting in only a tangential contact area between said pair of opposed rounded bearing surfaces. Through such tangential bearing arrangement, all of the directed forces exerted on the bearing in service are amply backed up by a reinforcing element that is combined with said bushing element, in a manner now about to be set forth.

The bushing element 9 is preferably made of a material that has a very low coefficient of friction and therefore is a good anti-friction element, as for instance of a plastic or of a powdered bearing metal, but inasmuch as this material when used alone, would not stand up properly in service and absorb the relatively heavy loading to which it would normally be subjected in service, I have reinforced said element with a cup 11 of a material having relatively high strength well able to withstand load and shock, such as of steel, and whereby the resultant composite bushing unit not only admirably takes up said load and shock but has highly efficient bearing surfaces.

This element 9 is formed with a central cavity 12 leading axially inwardly from its lower or planar end, so that there results an annular planar band face 13 at the bottom of said element 9 and which extends radially between the enclosing wall of said cavity and the convex bearing face of said bushing, said face 13 adapted to bearingly engage the opposed planar face of the stud head.

The steel cup is of such size and shape that when it is forced into said bushing cavity, its annular or enclosing side wall will receive and frictionally engage the circumferential bounding wall of the projection 7 and frictionally interlock with the corresponding annular enclosing awall of said cavity. In this position, the open end or rim of said cup will terminate approximately flush with the bottom planar end of said bushing element 9. It is to be noted that the depth of said cup is sufficiently more than the axial length of said projection 7 so that when said bushing unit is mounted in place on said stud, as indicated in Fig. 1, the opposed end walls of the cup and projection are axially spaced apart.

With such a construction and arrangement, it is seen that said weaker element of the bushing unit completely encircles the cup element except at the rim end of the latter. Now, when there is load transmitted between the bushing unit and stud, all side thrust between the same is taken by the steel cup, while all axial thrust is taken between the planar ends of the stud head and bushing unit.

In order to achieve an efficient lubrication system for the joint, I have provided a central hole 14 through the end wall of the cup and element 9, to communicate with an inlet opening 15 through the housing, to together provide a lubricant reservoir.

In order to transfer lubricant from said reservoir to the bearing faces of the joint, one or more grooves or passageways 16 may be formed in the bushing element 9, to lie concealed between the latter and said cup, communicating at the upper end with said reservoir and discharging at its lower end onto said pair of opposed planar bearing faces. In order to better enable said discharging lubricant from the reservoir to reach said opposed planar bearing faces, one or more grooves or passageways 17 are provided across said planar face of said bushing element.

I claim:

1. In a ball and socket type joint adapted to take a compression load during service in a motor vehicle and comprising a housing having a concave internal bearing surface, a stud member rotatable and tiltable in said housing and having a radially enlarged head within the latter and a shank that projects axially downwardly through said housing, said head having a convex bearing surface opposed to said concave bearing surface and having an annular band face that extends radially inwardly from adjacent the upper end of said convex surface, said head also having an upwardly projecting central projection axially beyond said band face and a transversely extending end face spaced axially from said band face, a bushing of relatively weak material interposed between said stud head and the concave bearing surface of said housing and having a transverse annular band face opposed to said first-mentioned annular band face, and there being an axially extending central cavity in said bushing to rotatably receive said central projection of said stud, said bushing also having a convex external surface bearing against said concave bearing surface and having a portion directed radially inwardly to overlie said end face of said stud head projection, and a cup of a material that is relatively much stronger than that of said bushing and lining substantially the entire cavity to reinforce said bushing and transmit all load between the latter and said stud while said planar faces are in engagement.

2. In a ball and socket type joint adapted to take a compression load in operative position on a motor vehicle and comprising a housing having a concave internal bearing surface, a stud member rotatable and tiltable in said housing and having a radially enlarged head within the latter and a shank that projects axially downwardly through said housing, said head having a convex bearing surface opposed to said concave bearing surface and having an annular band face that extends radially inwardly from adjacent the upper end of said convex surface, said head also having an upwardly projecting cylindrical central projection beyond said annular band face and terminating in a transverse end face spaced from said band face, a bushing of relatively weak material interposed between said stud head and the concave bearing surface of said housing and having a transverse annular band face opposed to and engaging said first-mentioned band face, and there being a central cylindrical cavity in said bushing to rotatably receive said cylindrical projection, said bushing also having a convex external surface to bear against said concave bearing surface of the housing, and a metal cup relatively stronger than said bushing and engaging and lining substantially the entire transverse end face of said cavity and the annular wall portion of the latter to reinforce said bushing and transmit load between the latter and said stud.

3. A joint as set forth in claim 2, but further characterized in that the curvature of the convex surface of the bushing is sufficiently greater than that of the concave bearing surface of the housing so that the two opposed bearing surfaces are not entirely complemental.

4. A joint as set forth in claim 3, but further characterized in that the depth of said cup is sufficiently greater than the length of said cylindrical projection of the stud to leave an axial clearance therebetween.

5. A joint as set forth in claim 2, but further characterized in that said bushing completely encloses said cup except at the rim face of the latter.

6. A joint as set forth in claim 2, but further characterized in that there is a hole through the upper end wall of the bushing to form a lubricant reservoir thereat, and there is a lubricant groove between said cup and the bushing and communicating at one end with said hole and dischargably communicating at its other end with said opposed annular band faces.

References Cited in the file of this patent

UNITED STATES PATENTS

| | | |
|---|---|---|
| 857,905 | Putnam | June 25, 1907 |
| 1,545,363 | Teves | July 7, 1925 |
| 2,507,108 | Lange | May 9, 1950 |